United States Patent [19]
Kelley

[11] 3,777,500
[45] Dec. 11, 1973

[54] PLOW HAVING A RECIPROCATING BLADE ATTACHMENT

[76] Inventor: Leon O. Kelley, P. O. Box 488, Stamford, Tex. 79553

[22] Filed: Oct. 12, 1971

[21] Appl. No.: 188,030

[52] U.S. Cl........................ 61/72.6, 30/355, 37/193, 172/40, 172/101, 172/713, 172/770
[51] Int. Cl. .......... E02f 5/02, A01b 3/64, F16l 1/00
[58] Field of Search................... 61/72.6, 72.7, 72.5, 61/72.1; 37/193; 172/40, 699, 101, 713, 770; 30/355

[56] References Cited
UNITED STATES PATENTS

| | | | |
|---|---|---|---|
| 3,136,077 | 6/1964 | Troeppl | 172/713 X |
| 3,657,831 | 4/1972 | Kant | 37/193 |
| 3,706,207 | 12/1972 | Cornelius | 61/72.6 |
| 3,497,016 | 2/1970 | Ryan | 61/72.6 X |
| 585,484 | 6/1897 | Shafer | 172/101 X |
| 797,926 | 8/1905 | Thomas | 172/101 X |
| 3,354,660 | 11/1967 | Vaughan | 61/72.6 X |
| 1,379,973 | 5/1921 | Gillespie | 30/355 |

*Primary Examiner*—Jacob Shapiro
*Attorney*—D. Carl Richards et al.

[57] ABSTRACT

The specification discloses a cable laying plow including a plow shank for connection to a prime mover. A plow point is mounted on the forward edge of the bottom of the plow shank, with guide structure connected to the rear of the plow shank for directing cable downwardly along the rear edge of the plow shank. An elongated frame slidably receives the forward edge of the plow shank and extends downwardly into the plow point. Sharpened teeth are formed along the forward edge of the frame for assisting in plowing operations and for cutting vegetation and the like. Pins on the plow shank extend through slots in the frame to limit the movement of the frame vertically with respect to the plow shank. A motor is mounted on top of the plow shank and linkage extends from the motor to the frame for reciprocating the frame along the forward edge of the plow shank during plowing operations.

11 Claims, 11 Drawing Figures

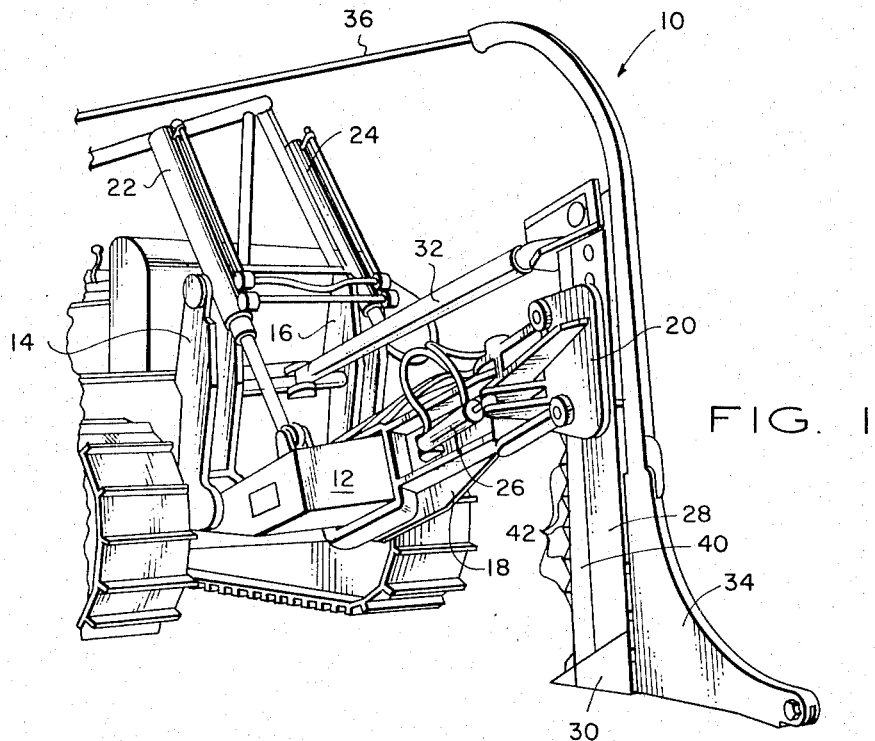
FIG. 1
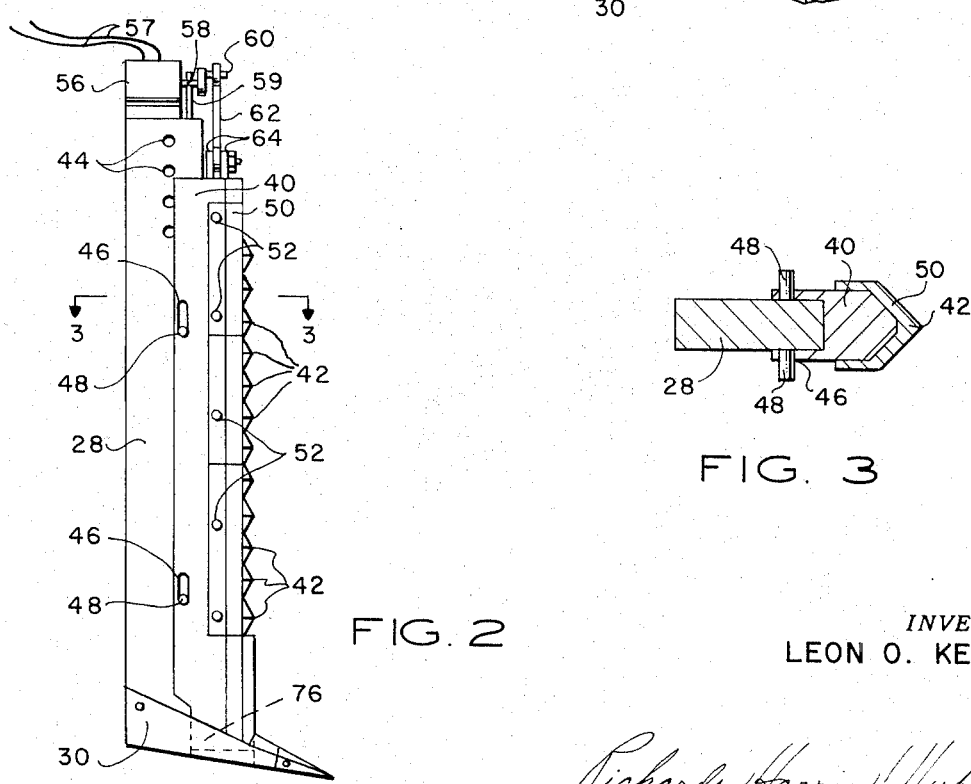
FIG. 2
FIG. 3
INVENTOR
LEON O. KELLEY
Richards, Harris & Hubbard
ATTORNEYS

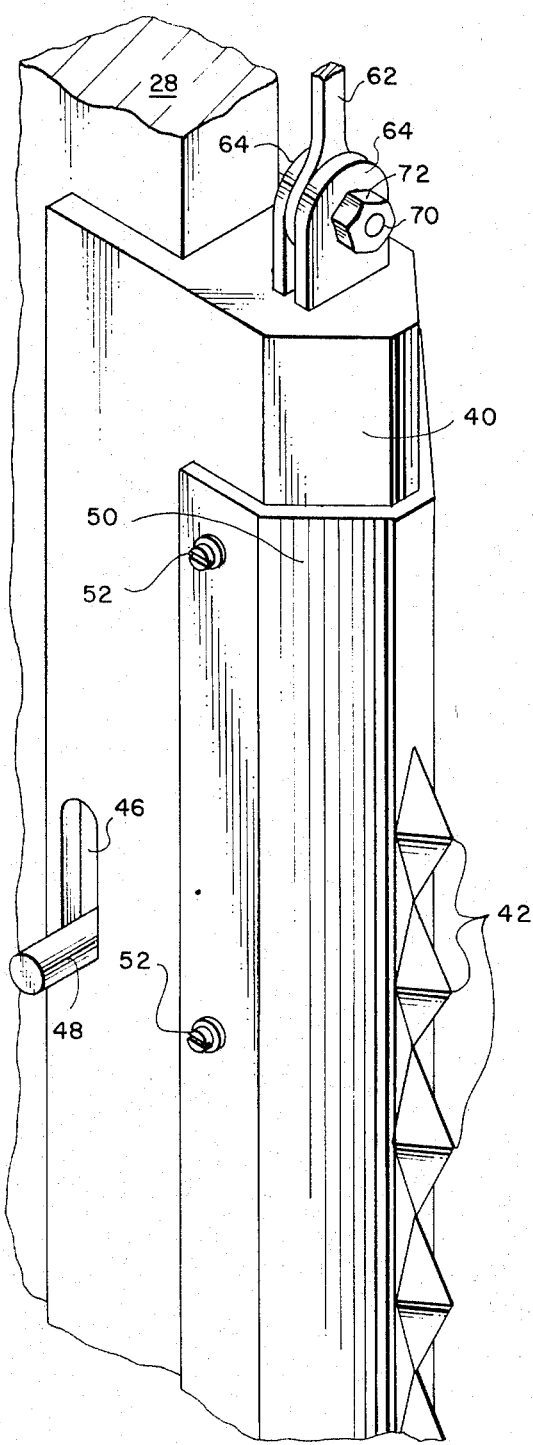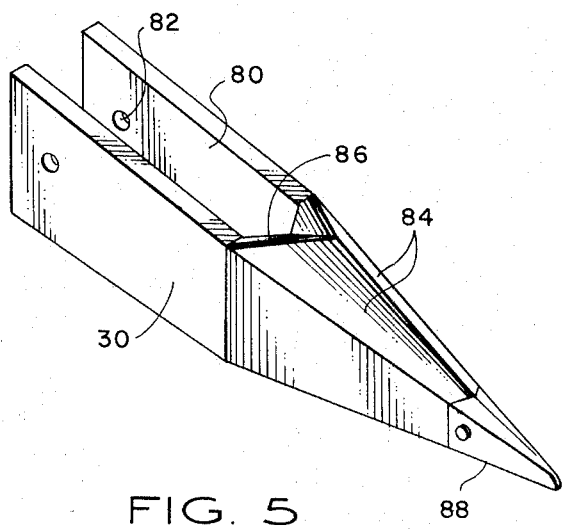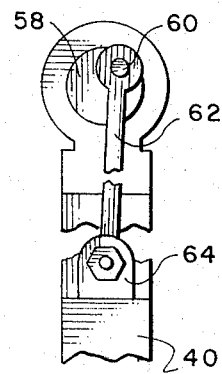

INVENTOR
LEON O. KELLEY
Richards, Harris, Hubbard
ATTORNEYS

PLOW HAVING A RECIPROCATING BLADE ATTACHMENT

FIELD OF THE INVENTION

This invention relates to a plow having a reciprocating blade attachment, and more particularly relates to a cable laying plow having a reciprocating blade on the forward edge thereof for assisting in plowing through and for cutting through vegetation and the like.

THE PRIOR ART

Various types of cable laying plows have been heretofore developed, and have generally comprised a downwardly extending plow shank having a cable laying chute attached to the plow shank for directing the cable into the furrow formed by the plow shank. The plow shanks of such cable laying plows have often included ground cutting elements which comprise a fixed sharpened edge along the forward edge of the plow shank to facilitate movement of the plow through the earth. However, such ground cutting elements have not been completely satisfactory in that grass and other vegetation has tended to accumulate on the forward edge of such plow shanks, thus tending to impede the proper operation of the plow. In addition, previously developed cable laying plows have generally required relatively large drafts due to their construction, thereby increasing the cost and difficulty of plowing in cable.

SUMMARY OF THE INVENTION

In accordance with the present invention, a frame having a plurality of cutting surfaces is slidably mounted along the forward edge of a plow shank. A motor is attached to the plow shank for reciprocating the frame vertically along the forward edge of the plow shank to reduce the draft required for the plow and to prevent the accumulation of grass and vegetation thereon.

In accordance with another aspect of the invention, a cable laying plow includes a plow shank adapted to be connected to a prime mover to extend downwardly into the ground. A plow point is mounted on the forward edge of the bottom of the plow shank. Structure directs cable downwardly along the rear edge of the plow shank and into the furrow formed by the plow shank. Blade structure is slidably mounted on the forward edge of the plow shank, with a motor being provided to reciprocate the blade structure vertically along the forward edge of the plow shank during plowing operations.

In accordance with another aspect of the invention, a cable laying plow includes a plow shank for being connected to a prime mover. A plow point is mounted on the forward edge of the bottom of the plow shank. Guide structure is connected to the plow shank for directing cable downwardly along the rear edge of the plow shank. An elongated frame slidably receives the forward edge of the plow shank and extends into the plow point. Teeth are formed along the forward edge of the frame. Structure limits movement of the frame relative to the plow shank. A motor is mounted on the top portion of the plow shank and is attached to linkage for reciprocating the frame along the forward edge of the plow shank during plowing operations.

DESCRIPTION OF THE DRAWINGS

For a more complete understanding of the present invention and for further objects and advantages thereof, reference is now made to the following description taken in conjunction with the accompanying drawings, in which:

FIG. 1 illustrates a perspective view of the cable laying plow system of the present invention;

FIG. 2 is a side view of the plow shank structure shown in FIG. 1;

FIG. 3 is a sectional view taken generally along the section lines 3—3 in FIG. 2;

FIG. 4 is a perspective view, partially broken away, of the forward edge of the plow shank system shown in FIG. 2;

FIG. 5 is a perspective view of the plow toe of the invention;

FIG. 6 is a front view, partially broken away, of the motor and eccentric linkage of the present system;

DESCRIPTION OF THE PREFERRED EMBODIMENT

Figure 7:
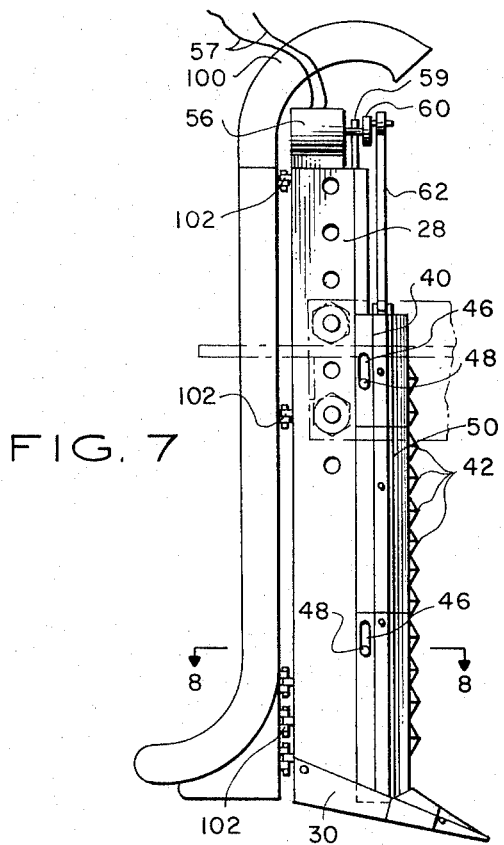
FIG. 7 is a side view of a second embodiment of the present cable laying invention.

Referring to FIG. 1, a cable laying plow according to the present invention is illustrated generally by the numeral 10. Plow 10 comprises a plow support frame 12 which is pivoted in upright spaced apart frames 14 and 16 attached to the rear of a prime mover such as a tractor or the like. A bifurcated frame 18 is pivoted for generally horizontal movement within the frame 12 and supports at its rearward end a toolbar holding element 20. Hydraulic cylinders 22 and 24 enable the present cable laying plow to be raised vertically into and out of engagement with the ground. Hydraulic cylinders 26 are mounted on either side of the bifurcated frame 18 in order to control the alignment of the toolbar holding element 20.

A plow shank 28 is rigidly mounted within the toolbar holding element 20 and extends vertically downwardly for engagement with the ground. The plow toe 30 extends forwardly of the plow shank 28. A parallelogram linkage bar 32 is connected to the upper portion of the plow shank 28 for support thereof. A cable laying chute 34 is pivotally mounted rearwardly of the plow shank 28 and is operable to feed a flexible cable or other conduit 36 rearwardly of the plow shank 28 and to lay the cable or other conduit into the furrow made by movement of the plow shank 28 through the earth. For a more detailed description of a similar cable laying plow arrangement, reference is made to U. S. Pat. No. Re. 26,718, issued Nov. 18, 1969, to Applicant.

During operation of the cable laying plow 10, grass and other vegetation tends to accumulate on the forward portion of the plow shank 28, thereby obstructing passage of the plow through the earth. In addition, it is desirable to provide a sharpened cutting surface on the forward edge of the plow shank 28 in order to facilitate plowing. In accordance with the present invention, a frame 40 is mounted on the forward edge of the plow shank 28 and is reciprocated vertically along the forward edge of the plow shank 28. The frame 40 includes a plurality of sharpened cutting surfaces or teeth 42 which are reciprocated vertically to cut away grass and other vegetation which may tend to collect on the plow during plowing operations, and also to assist in cutting through the ground during plowing operations. The present plow invention substantially reduces the required draft for operation of the plow, and reduces the swell of the furrow, thereby reducing cleanup after plowing in the cable. These advantages arise due to the teeth 42 cutting through the earth, as well as cutting through accumulated vegetation.

FIG. 2 illustrates a side view of one embodiment of the present invention. The plow shank 28 includes a plurality of apertures 44 for being pinned to the toolbar holding element 20 of the cable laying device. The frame 40 includes a pair of slots 46 formed therein which receive pins 48 which project outwardly from the sides of the plow shank 28. The pins 48 thus limit the amount of vertical reciprocation possible by the frame 40.

The cutting teeth 42 are formed along an elongated support member 50 which is removably attached to the frame 40 by bolts 52. In the preferred embodiment, support member 50 is formed by three separate sections in order to facilitate removal and replacement of worn teeth 42.

As may be seen in FIG. 3, the support member 50 has a generally U-shaped cross section and encompasses the forward edge of the frame 40. The frame 40 is bifurcated and recieves the forward edge of the plow shank 28. The pins 48 extend through the apertures 46 in the frame 40 to hold the frame 40 in place during reciprocating movement thereof.

A hydraulic motor 56 is rigidly attached to the top of the plow shank 28 and includes an output shaft 58. Hydraulic lines 57 supply hydraulic fluid to the motor 56. The output shaft 58 of the motor is supported by a bearing support 59 and includes an eccentrically mounted pin 60 which pivotally receives the upper end of a linkage 62. The bottom end of the linkage 62 is pivotally mounted between ears 64 which are upstanding from the top of the frame 40.

FIG. 4 illustrates a perspective view of the invention and illustrates the interconnection of the linkage 62 between the upstanding ears 64 by means of a bolt 70 and a locknut 72. FIG. 4 particularly illustrates the tapered front edge of the frame 40 and illustrates how the elongated support member 50 is attached to the frame 40 by means of bolts 52. The three sections comprising the front support member 50 may be removed from the frame 40 to enable sharpening or replacement of the teeth 42. As shown in FIG. 4, it will be seen that each of the teeth 42 is provided with a pyramidal configuration to provide four outwardly extending sharpened edges in order to provide excellent cutting capability.

FIG. 2 illustrates how the bottom end 76 of the frame 40 is slidably received within an aperture in the plow toe 30. This prevents dirt from stopping the reciprocating action of the frame 40.

FIG. 5 illustrates in more detail the construction of the plow toe or point 30, wherein an aperture 80 is defined through the rearward edge of the point 30. The toe includes apertures 82 for bolting onto the plow shank 28, with spaces then being left in the aperture 80 to receive the lower end 76 of the frame 40. The toe 30 includes upwardly bevelled edges 84 which extend to meet bevelled edges 86. These sloping edges facilitate removal of dirt from the toe and tend to eliminate unwanted accumulation of dirt during plowing operations. The rearwardly sloping surfaces 86 tend to allow soil to slide down through the aperture 80 in the plow point. A removable point 88 is provided on the forward edge of the point 30 to enable removal or replacement of worn parts and the like.

FIG. 7 illustrates a side view of a second embodiment of the present cable laying plow invention. Like numerals are utilized for like and corresponding parts throughout the specification. In this embodiment, a different construction of a cable feeding chute 100 is utilized. The chute extends downwardly and is pivotally connected to the rear of the plow shank 28 by pivots 102. The basic construction and operation of the plow shown in FIG. 7 is similar to that previously described, with a hydraulic motor 56 operating an eccentric shaft 60 to reciprocate vertically a linkage 62. The linkage 62 is pivotally connected to the top of a frame 40 which includes a detachable elongated support member 50 containing a plurality of teeth 42. Slots 46 in the frame 40 receive pins 48 for limiting the movement of the frame. A plow point 30 slidably receives the lower end of the frame 40 during reciprocation thereof.

Figure 8:
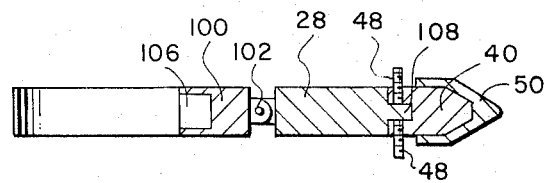
FIG. 8 is a sectional view taken generally along the section lines 8—8 in FIG. 7.

FIG. 8 illustrates a sectional view of the plow shown in FIG. 7. The chute 100 includes an aperture 106 therethrough for feeding a cable or other conduit rearwardly of the plow. The plow shank 28 includes a forwardly projecting rib 108 which is slidingly received by a mating aperture in the frame 40. The pins 48 extend through apertures in the frame 40 in the manner previously described. The closely mating rib 108 and the groove in the frame 40 provide a very strong structure which tends to prevent dirt and other debris from disrupting the smooth reciprocation of the device.

Figure 9:
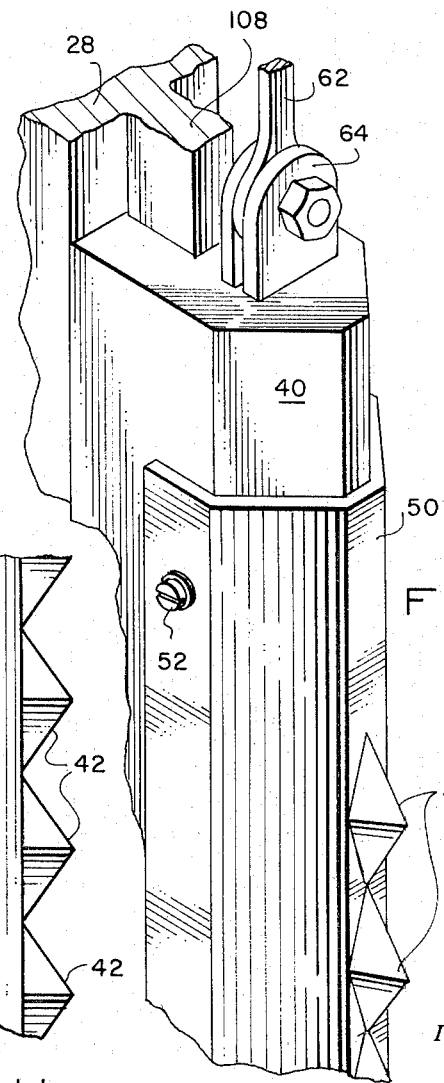
FIG. 9 is a perspective view, partially broken away, of the system shown in FIG. 7.
Figure 10:
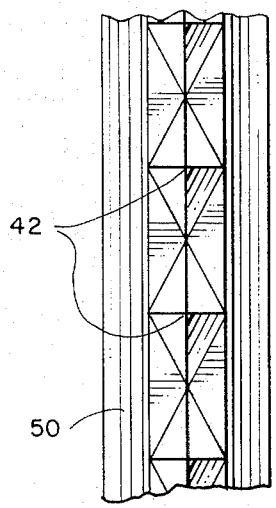
FIG. 10 is a front view of the sharpened teeth of the system shown in FIG. 7.
Figure 11:
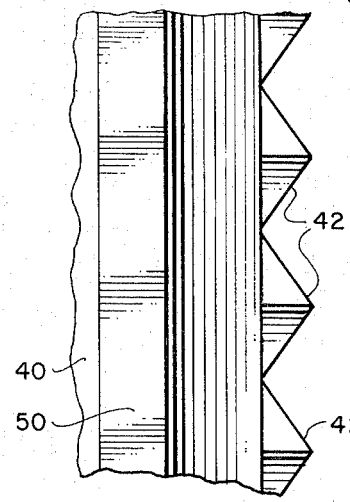
FIG. 11 is a side view of the sharpened teeth shown in FIG. 10.

The construction of the rib 108 and the receiving aperture in the frame 40 is further illustrated in FIG. 9. Also illustrated in FIGS. 9—11 is the construction of the teeth 42. As shown in FIG. 10, each tooth 42 includes four sloping surfaces to form an elongated pyramidal configuration. Each of the four sloping edges of each tooth 42 is sharpened to provide a plurality of cutting surfaces. The sections comprising the elongated support member 50 may be removed from the frame 40 by detachment of the bolts 52, thereby allowing the individual teeth 42 to be sharpened or replaced. The teeth 42 are preferably constructed from an extremely hard metal in order to provide long use. Teeth 42 are self-sharpening due to the interaction with the soil during plowing operations.

Although not illustrated in the drawings, it will be understood that the present invention encompasses the use of stationary guides which direct grass and other vegetation to the reciprocating teeth and aid in severing the vegetation.

It will thus be seen that the present invention provides a cable laying plow which is rugged in construction and which provides excellent operating characteristics. The present plow tends to prevent grass and other debris from collecting on the forward edge of the plow during plowing operations, and also provides easier plowing operations due to the reciprocating sharp teeth on the forward edge of the plow. The present plow provides a very light draft and reduces swelling of the furrow being plowed. The present plow configuration may be very simply disassembled for repairing and the like, with the teeth of the invention being detachable for sharpening or replacement when desired.

Whereas the present invention has been described with respect to specific embodiments thereof, it will be understood that various changes and modifications will be suggested to one skilled in the art, and it is intended to emcompass such changes amd modifications as fall within the scope of the appended claims.

What is claimed is:

1. In a cable laying plow including a plow shank terminating in a plow tip and structure for directing cable downwardly along the rear edge of the plow shank, the combination comprising:
   an elongated frame mounted for vertical sliding movement along the forward edge of said plow shank,
   a plurality of sharpened teeth along the forward edge of a unitary support, said support being detachably connected to the forward edge of said frame, and
   means connected to said frame for reciprocating said frame along the forward edge of said plow shank.

2. A cable laying plow comprising:
   a plow shank adapted for connection to a prime mover, said plow shank having a longitudinal vertical guide portion disposed along its forward edge,
   a plow toe mounted on the forward edge of the bottom of said plow shank, said plow toe defining a vertical slot therein and having top and sides converging in a forward point and further having a surface rearwardly tapering in said top surface intersecting said slot,
   a guide structure connected to said plow shank for directing a cable downwardly along the rear edge of said plow shank,
   frame means supported on the forward edge of the plow shank and receiving said vertical guide portion thereof,
   a generally V-shaped support member detachably secured to said frame, said support being formed in a plurality of vertically spaced sections with the lowermost section extending into said plow toe slot,
   a plurality of forwardly facing teeth carried on the forward edge of each section of said support member,
   a hydraulic motor mounted on said shank and having an output shaft, and
   eccentric drive means connecting said output shaft to said frame means whereby actuation of said motor and advancement of said prime mover, will cause severing of the soil by said teeth and separation and removal of dirt and debris along said plow toe surface and through said plow toe.

3. The plow according to claim 2 wherein said guide structure is pivotally connected to said plow shank.

4. The plow according to claim 3 wherein said guide structure comprises chute means.

5. The plow defined in claim 2 and further comprising:
   means for limiting the range of movement of said frame along said plow shank.

6. The plow defined in claim 5 further including:
   projections extending from said plow shank through slots in said frame for preventing separation between said plow shank and said frame.

7. The cable laying plow defined in claim 2 wherein said teeth have a pyramidal configuration.

8. The plow according to claim 2 further characterized by cooperating means on the plow shank and the frame for limiting the extent of vertical reciprocation of the frame under the action of the motor means.

9. The plow according to claim 8 wherein said motor means and said frame are operatively interconnected by a rotary eccentric driven by the motor means and a linkage interconnecting the rotary eccentric and the frame.

10. The plow according to claim 2 wherein the cutting teeth define both upwardly and downwardly facing cutting edges and are therefore operative to effect cutting in both directions of reciprocation of the frame.

11. The combination of claim 2 wherein each of said teeth include at least four cutting edges.

* * * * *